United States Patent

[11] 3,612,326

| [72] | Inventor | Raymond H. Marks<br>Woodcliff Lake, N.J. |
|---|---|---|
| [21] | Appl. No. | 808,761 |
| [22] | Filed | Mar. 20, 1969 |
| [45] | Patented | Oct. 12, 1971 |
| [73] | Assignee | Tenneco Chemicals, Inc. |

[54] EXTENSION SEAL FOR A PLASTIC CONTAINER
5 Claims, 5 Drawing Figs.

[52] U.S. Cl...................................................... 215/40,
 215/1.5, 150/.5
[51] Int. Cl...................................................... B65d 23/00,
 B65d 53/00
[50] Field of Search........................................... 215/40, 1.5,
 43; 150/.5

[56] References Cited
UNITED STATES PATENTS

| 2,937,481 | 5/1960 | Palmer.......................... | 215/40 UX |
| 3,201,014 | 8/1965 | Livingstone.................. | 215/40 UX |
| 3,311,250 | 3/1967 | Lodding et al................ | 215/40 |

*Primary Examiner*—George T. Hall
*Attorneys*—Daniel J. Reardon, Saul R. Bresch, George E. Lilly and Evelyn Berlow ABSTRACT: A container comprising a body portion composed of a rigid polyvinyl chloride composition, said body portion having an annular threaded neck adapted to receive a reciprocally threaded closure, said neck terminating in an annular lip, and an annular extension portion composed of a flexible polyvinyl chloride composition affixed to said lip by fusing a vinyl chloride plastisol in juxtaposition with said lip to provide, in combination with the body portion, a unitary structure, said extension portion being adapted so that the extremity thereof will fit securely against the top of said threaded closure when the threads of said closure fully engage the threads of the neck to provide an airtight and a watertight seal.

PATENTED OCT 12 1971 3,612,326

EXTENSION SEAL FOR A PLASTIC CONTAINER

This invention relates to an extension device for a plastic container and, more particularly, to an extension of said plastic container which will effectively improve known containers which will effectively improve known containers in a simple, yet effective, way.

The manufacture of plastic receptacles of all sized and shapes has become an essential part of the packaging industry providing untold advantages to manufacturers of products which must be transported and sold in packages. Liquids, such as detergents and cosmetics, especially lend themselves to being packaged in plastic containers in view of the virtual unbreakability of the container both during transport and in the hands of the consumer. The advent of clear plastic from which these containers can be made enhances their usefulness to manufacturers who wish to display their product to the public. Currently, polyvinyl chloride is one of the most important plastics used in containers made for the purpose of carrying liquid products from manufacturer to consumer; however, other vinyl polymers and copolymers have found a place in this segment of he highly competitive packaging field.

Typically, a plastic container or bottle has two distinct, although integral, parts, i.e., a body portion and a neck portion. The neck portion is generally threaded so as to receive a closure or cap which is also threaded in reciprocal manner so that it can be readily screwed on to the neck portion of the bottle. The neck portion is connected on one end to the shoulders of the container. The other end of the neck portion has a lip, the threads being in between the lip and the body portion.

A typical cap or closure can be described as a circular plate from the outer periphery of which and at right angles thereto extends a cylindrical sidewall having on its interior surface threads which are adapted to engage the threaded neck of the bottle. The cap is seated on the neck and turned so that the interlocking of the cap threads with the neck threads securely holds the cap to the bottle. Generally, in the cap there is a liner which is made of various materials ranging from paper and foil laminates to plastic. The liner is placed in the cap against the circular plate and above the threads. It is of sufficient thickness and diameter to seat itself on the lip or rim of the bottle so that when the cap is screwed on, the liner is pressed against the lip and a seal is formed. There are also containers and closures without threads which are engaged by friction. However, threaded containers and closures are more commonly used.

Capping is generally accomplished commercially in a factory on an assembly line. For example, plastic bottles are placed on a conveyor belt and are first filled with a liquid product through the use of a metered filling device. The filled bottles then move along the line to a point where caps, being fed from a tube, are placed on the necks of the bottles in a free position. Then, a simple level plate, parallel to the conveyor belt, levels the caps, which are turned by high-speed automatic chucks operated by means of a slip clutch. The torque which is produced by the high-speed chucks turns the cap into position. The high impact and shear evolving from this capping procedure can and does, in many cases, result in damage to the neck and cap. When damage occurs, the end result is a jam on the assembly line and a slowdown in production which raises the cost of the product. Defective containers, especially the neck and lip portions, and caps are prone to such damage as well as caps which are not centered or seated correctly on the lip of the bottle. One cause of faulty centering or seating is a displaced or defective liner. The defect may be an inherent result of the manufacture of the liner. For instance, some liners are made with foil on the product side of the liner and pulp board on the cap side of the liner. This arrangement reacts to the moisture with which it comes in contact in such a manner that when it is dry, the pulp board shrinks and the liner takes on a convex shape and when it is damp the pulp board expands and the liner takes on a concave shape. Whatever the cause, displaced or defective liners play havoc with the proper seating of the cap. Displaced and defective liners are also a problem on the consumer end where, for example, liners adhere to the lip of the bottle, become disengaged from the cap and lose their effectiveness.

Where defective containers, caps or liners do not cause a jam on the assembly line, the defective piece together with the force of automatic capping are responsible for a high percentage of "leakers", which cause difficulty from the bottler through to the consumer.

There is a need, therefore, for a plastic container which is more resilient to the force of high-speed automatic capping, is conducive to correct seating of the cap, avoids the need for cap liners and reduces the number of defects occuring in the neck of the container.

An object of this invention is to provide such a plastic container, i.e., one which will be more receptive to the force of automatic capping and will aid in proper seating of the cap.

A further object is to provide a container which will accept an unlined cap and yet maintain an effective seal.

Still another object is to provide containers with a smaller percentage of defects, especially in the lip portion.

Another and further object is to provide a process for preparing a plastic container with an extension device thereon in such a manner so as to be both expedient and commercially acceptable, i.e., the extension device must be affixed so that it cannot be removed or dislodged by the force of automatic capping since such a result would be self-defeating.

Other objects and advantages will become apparent hereinafter.

In accordance with the present invention, a plastic container is provided which comprises a body portion composed of a rigid vinyl polymeric composition, said body portion having a neck adapted to receive a closure and terminating in a lip, and an extension portion composed of a flexible vinyl polymeric composition fused to said lip wherein the body portion and the extension portion form a unitary structure and said extension portion is adapted to fit securely against the top of said closure to obtain an airtight and watertight seal.

The process for making the described plastic container comprises the following steps:

a. bringing the lip of the container into contact with sufficient vinyl plastisol to form the extension portion; and b. fusing the vinyl plastisol in juxtaposition with said lip to provide a unitary structure. Referring to the drawing.

Figure 1:
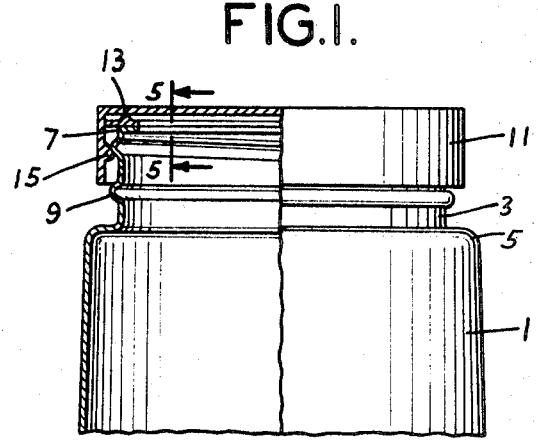
FIG. 1 is a side view of the upper portion of a finished container with cap in closed position wherein the container and cap are shown partly in section.

FIG. 1, as noted, is a side view of the upper portion of a finished container exemplified by a cylindrical bottle with cap in closed position. Body portion 1 has a threaded neck 3 attached to the shoulders 5 thereof making up a one-piece container, which can be prepared by conventional blow-molding techniques. Neck 3 is a hollow annular portion extending axially from body portion 1 and terminating at its outer extremity in an annular lip 7. Neck 3 is provided with suitable threads 9 for accommodation of a threaded closure or cap 11 of conventional detachable design. Extension device 13 is affixed to lip 7 by the process described above and in more detail below. Extension device 13 is an uninterrupted continuation of body portion 1 providing a one-piece unitary structure by virtue of the process which is a subject of the instant invention.

Although a line of demarcation can be observed in the drawing between lip 7 and extension device 13, the line is not observable in practice nor is there any indication of a seam or juncture at that point. It is found that no failures occur due to a parting of extension device 13 from lip 7 such as might happen where adhesives or other bonding materials and techniques are used. Indeed, the strength of the bond is considered at the level of a structure prepared from a single mold. The length or height of extension device 13, i.e., the measurement perpendicular to lip 7, is simply determined on the basis of the cap to be used. As will be noted by referring to cap 11, a space is left between cap threads 15 and the circular plate which forms the top of the cap. This conventional insofar as threaded caps presently in commercial use are concerned. Extension device 13 must be of sufficient height to cooperate with the inner top of cap 11 to provide a liquidtight seal after the cap has been screwed on by the machine-capping procedure. The flexible extension device 13, which by its nature is resilient, also holds the cap securely in place when the screw-on pressure is released in cooperation with the reciprocal thread arrangement.

First, under machine pressure, extension device 13 is deformed and, when the force is relaxed, memory brings extension device 13 back into its original state and thus supplies the pressure necessary to keep cap 11 secure while providing an airtight and watertight seal. The capability of providing such pressure is lacking in the various fitments and liners in common industrial use.

Cap 11 is forcibly screwed on during machine capping and the neck of the container as well as the cap itself receives a forcible impact and shear when the cap is turned into place by the high-speed automatic chucks as discussed above. This is believed to account for the substantial number of jams which take place at the point of capping on the assembly line. In the instant invention, the smooth flexible extension device 13 provides a seat for the cap and assists in keeping the cap on dead center thus eliminating unbalanced capping and, most important, absorbs some of the force of the high-speed automatic chucks.

The length or height of extension device 13 is optional and can be selected to suit available caps which generally have some clearance between their threads and tops, especially those which were prepared to be used with cap liners. The length of the extension device can be 0.25 millimeter or less where practicable and is generally 1 or 2 millimeters; however, it is contemplated that the portion referred to as the extension device be greater than 1 or 2 millimeters where expedient. The qualities provided by the flexible plastic extension device are not diminished by varying the length to suit the particular caps involved. The length should be selected according to that necessary to obtain a watertight and airtight seal between the extension device and the closure or cap. As long as this is accomplished, there is no obstacle to using various sizes and shapes of containers and caps. In fact, the extension device provided herein gives more versatility in the selection of both. When the closure is screwed on to the neck of the bottle, pressures are created between the closure and the extension device. When the extension device is a flexible material, as required, the area of the device expands to make a simple and effective seal at the periphery of the top of the cap. This seal, as has been pointed out before, is both fluidtight and airtight and vacuum sealing is therefore easily accomplished. The seal is so effective that small errors in fit of the reciprocal threads are nullified and the seal derived from the cooperation of the threads is thereby eliminated as an important factor in "leakers". It has been found that various liquids such as shampoos, hair oils and creams, other liquid cosmetics, paints, and detergents are as effectively maintained in the containers provided for by this invention as in those containers having caps with liners.

It has also been found that widemouth jars, which have always created leakage problems, are no longer a problem when the extension device is used. It is apparent, of course, that when liners are used, the only effective sealing portion of the liner is at its periphery. Since the extension device of this invention is located only at the sealing point and cannot be dislodged because it is not mechanically attached to the cap or container, its entire area becomes an effective sealing device and, because it can be deformed by pressure to meet the irregularities of the cap and can withstand the pressures of capping, its memory exerts sufficient pressure against the cap to accomplish a strong and effective seal which is not disturbed by the high-speed capping process.

An additional feature of this invention and one which also has provided a problem for bottle manufacturers of plastic bottles is overcoming the sharp edge and irregularities which are caused when excess plastic is removed from the neck after blow molding. The application of the extension device to the lip equalizes the defects in the lip of the bottle and finishes off the lip of the bottle so as to avoid any problem with sharp edges and irregularities that may occur. Further, it is apparent that the seal provided between the extension device and a cap is more effective than a seal provided between an irregular lip and cap liner.

It is important that the vinyl composition from which the extension device is derived be composed of substantially 100 percent solids, a characteristic of a plastisol. Compositions containing solvents are not satisfactory because the solvent evaporates and the remaining plastic is deformed thus detracting from an effective extension device.

The preferred composition for use in this invention is a vinyl plastisol, which is a dispersion of the fine particles of resin in a plasticizer. Heating the plastisol dissolves or solvates the resin particles in the plasticizer causing the composition to gel. After gelling, the composition fuses and becomes a conventional thermoplastic material. When the thermoplastic material cures on the lip of the plastic container, it becomes an integral part thereof forming a unitary one-piece structure and, as noted above, no juncture can be discerned between the body portion and the extension device.

The vinyl plastisol can be free of blowing agent thus on fusion forming a noncellular thermoplastic material or it can contain a blowing agent such as azodicarbonamide, which forms, after fusion, a closed cell thermoplastic foam. Blowing agents forming open cell foams should be avoided since the extension device would be ineffective in a sealing capacity.

The composition of the plastic container and the extension device are preferably the same with respect to the initial monomers. The rigid vinyl composition contains little or no plasticizer and the flexible vinyl, of course, contains plasticizer. Any compatible vinyl materials are contemplated, however. The vinyl compositions can include vinyl chloride polymers and vinyl copolymers in which chloride is in major proportion i.e., greater than 50 percent by weight. Polymers and copolymers of vinyl esters of carboxylic acids, e.g., vinyl acetate, vinyl propionate, vinyl butyrate, vinyl benzoate, vinyl halides, vinylidene halides, vinyl alcohol, and vinyl acetals such as vinyl butyral are among the vinyl compositions contemplated.

The flexible vinyl polymeric compositions can be further described as being of fine particle size, e.g., about 0.1 to about 25 microns, and having a relative viscosity of about 2.0 to 3.5 (1 percent cyclohexanone at 25°C.). The rigid vinyl polymeric compositions can be of similar fine particle size with a relative viscosity of 1.5 to 2.5 (1 percent cyclohexanone at 25° C.). The preferred vinyl polymeric compositions, rigid or flexible, are polyvinyl chloride or a copolymer of vinyl chloride and vinyl acetate containing up to about 14 percent vinyl acetate. The compositions are conventional containing the usual additives in well-known proportions. For example, the rigids can contain small amounts of modifiers such as styrene or acrylonitrile and lubricants such as stearic acid. All of the compositions generally contain stabilizers such as organotin compounds or metal benzoates and the flexible compositions contain conventional plasticizers.

The rigid vinyl polymeric compositions herein have a stiffness or apparent modulus of elasticity greater than 100,000 p.s.i. at 23° C., when determined in accordance with the Standard Method of Test for Stiffness in Flexure of Plastics (ASTM Designation: D 747). The flexible vinyl polymeric compositions herein have a stiffness or apparent modulus of elasticity of not over 10,000 p.s.i. at 23° C. when determined in the same manner as for the rigid compositions.

A discussion of plastisols and cellular vinyls appears in the Plastics Engineering Handbook, Third Edition, Reinhold Publishing Corporation, New York, 1960, at pages 223 to 239 and 188 to 197, both inclusive, and this discussion is incorporated by references herein as well as the examples of plasticizers set forth in table 16-2 at pages 240 and 241.

Figure 2:
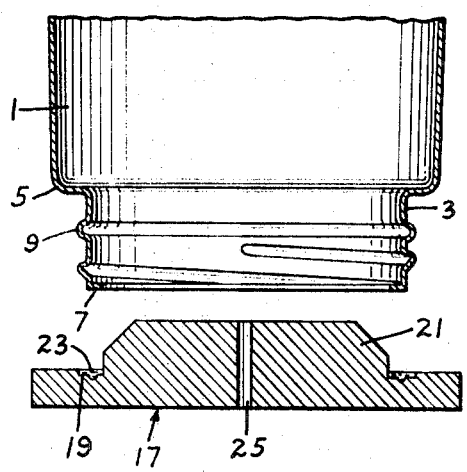
FIG. 2 is a cross section of the container and mold wherein the container is in a raised position before lowering to mold. Vinyl plastisol has been introduced into the mold.
Figure 4:
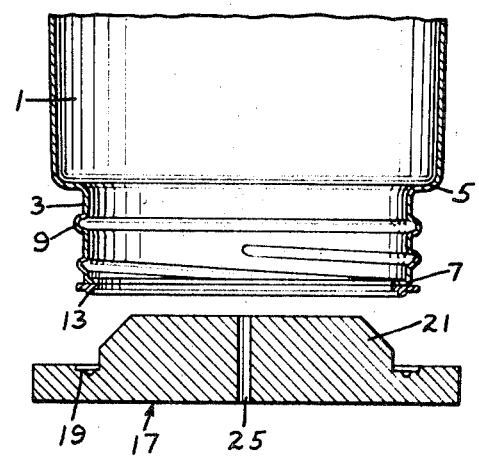
FIG. 4 is a cross section of container and mold wherein container is in a finished state and in a raised and released position.
Figure 3:
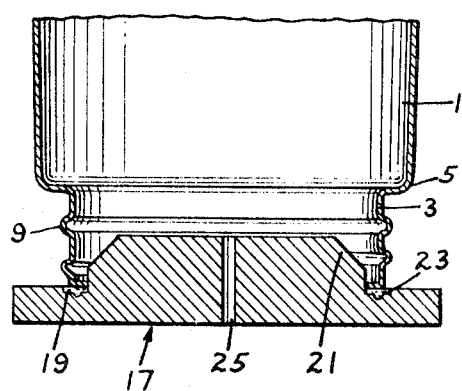
FIG. 3 is a cross section of container and mold wherein container is in fusing position.
Figure 5:
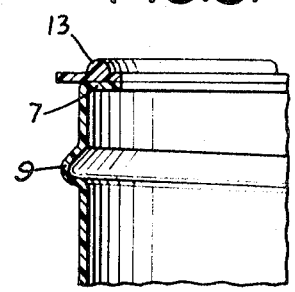
FIG. 5 is a fragmentary view of container showing detail taken along line 5—5 of FIG. 1 with cap removed. A detailed description of the invention with reference to the drawing, in which like reference characters refer to like parts throughout the several figures of the drawing, follows.

A more detailed description of the process follows with reference to FIGS. 2 to 4 of the drawing:

1. A circular plate 17, which can be made of metal or other materials not deformed by heat at the temperatures used herein, e.g., polytetrafluoroethylene, is provided. The circular plate has an annular groove 19 which is shaped to provide the desired extension device. There is an elevated portion 21 centered on the plate, which holds the container in position when it is placed on the plate. The outer diameter of the elevated portion is designed to provide a snug fit for the inner diameter of the container. The elevated portion 21 can be modified to accommodate a particular container. Plate 17 together with groove 19 and elevated portion 21 are constructed so that lip 7 will rest on the surface of the liquid plastisol introduced into groove 19. In the center of plate 17 there is a venting hole 25 which provides a release for expanded residual gases and warm air so that the container is not unseated during the process and before fusion is complete. The gases are built up because of the heat applied to plate 17 to accomplish fusion of the plastisol. Groove 19 is conveniently made of material which will release the extension device when fusion is completed.

2. Plastisol 23 is introduced into groove 19, the depth of which has been selected according to the cap to be used for the container.

3. The rigid plastic container is then inverted and neck 3 is placed in position with respect to elevated portion 21 so that lip 7 rests on the surface and against plastisol 23.

4. Plate 17 is then heated to a temperature of approximately 350° F. The temperature is selected according to the plastisol and can range from 200° to 600° F. or can be any other temperature which is required to fuse the plastisol.

5. After about 1½ minutes, the container with extension device 13 fused thereto can be blown off plate 17 by forcing air through venting hole 25. Squelching with water can also be used to separate the finished bottle from the mold. The time for fusion can range from a few seconds to several minutes, e.g., 30 seconds to 3 minutes. The time is best determined by experience with the plastisol composition used.

As can be seen from this process, containers with extension devices can easily be prepared on a continuous production line very simply and effectively. It also should be pointed out that the order of steps in the process can be changed, e.g., plate 17 can be heated before the plastisol is introduced into groove 19 or before lip 7 is placed against the plastisol. However, care must be taken in this case that fusion is not completed before lip 7 is placed in contact with plastisol 23. Gelling, however, can be taking place.

If means are provided for the introduction of plastisol 23 after the container is in place, the order of steps can be changed so that placing of the container and heating precede the plastisol. Other modifications of the process can also be used to accomplish the end result. For instance, extension device 13 can be prefused in groove 18 independent of the container. Lip 7 can then be coated with plastisol and placed against the fused plastisol. Heat is then applied to plate 17 as described and the finished container removed.

It should be pointed out that a distinctive problem arises when heat from plate 17 reaches lip 7 by conduction. This may cause heat distortion, which, in turn, may result in defective containers. To overcome this problem plate 17 is insulated in its entirety except for groove 19 or elevation 21 is insulated and, further, heat application is localized at groove 19. A more sophisticated way of avoiding heat distortion is to provide a plate 17 made from polytetrafluoroethylene and use radiofrequency heating.

EXAMPLE

The foregoing process as described in aforementioned steps 1 to 5, inclusive, is carried out several times using an insulated plate 17 and a temperature of 355° F. The depth of groove 19 is about 0.8 millimeter. Rigid containers are prepared from fine particle size polyvinyl chloride dispersion resin which is extruded into a parison and blow molded into a container by conventional blow-molding techniques.

Two compositions of plastisol used are as follows:

| Component | Parts by weight A | B |
|---|---|---|
| Fine particle size polyvinyl chloride dispersion resin | 100 | 100 |
| di(2 ethylhexyl) phthalate as a plasticizer | 60 | 40 |
| Ba-Cd-Zn salts of benzoic acid as a stabilizer | 3 | 3 |
| Epoxidized soy bean oil as a stabilizer | 5 | 5 |

Unitary containers thus formed are then placed on a production one line which includes automatic capping machinery as described above. It is found that capping is effectively carried out without damage to the cap or neck of the containers and that the seals provided between the extension device and the cap are essentially airtight and watertight.

I claim:

1. A plastic container comprising a body portion composed of a rigid substantially unplasticized vinyl polymer composition having a modulus of elasticity of at least about 100,000 p.s.i., said body portion having a neck adapted to receive a sealed closure and terminating in a lip, and an annular extension portion composed of a flexible plasticized vinyl polymer composition having a modulus of elasticity of not greater than about 10,000 p.s.i., the extension portion being fused to the lip and extending axially and perpendicularly out from the lip such that the body portion and the extension portion form a unitary structure and the extension portion is adapted to fit securely against the top of the closure received by the neck to obtain an airtight and watertight seal.

2. The container defined in claim 1, wherein the neck is threaded and is adapted to receive a reciprocally threaded closure.

3. The container defined in claim 2, in combination with a reciprocally threaded closure wherein the threads of the container and closure are fully engaged and the extension portion forms an airtight and watertight seal with the closure.

4. The container defined in claim 1, wherein the vinyl polymeric composition is polyvinyl chloride.

5. A plastic container comprising a body portion composed of a rigid substantially unplasticized polyvinyl chloride composition having a modulus of elasticity of at least about 100,000 p.s.i., said body portion having an annular threaded neck adapted to receive a reciprocally threaded closure, said neck terminating in an annular lip, and an annular extension portion extending axially and perpendicularly out from the lip, the extension portion being composed of a flexible plasticized polyvinyl chloride composition having a modulus of elasticity of not greater than about 10,000 p.s.i., and being affixed to said lip by fusing a vinyl chloride plastisol in juxtaposition with said lip to provide in combination with the body portion a unitary structure, the extension portion being adapted so that the extremity thereof will fit securely against the top of the threaded closure when the threads of the closure fully engage the threads of the neck to provide an airtight and watertight seal.